United States Patent [19]

Grenoble et al.

[11] 4,415,437

[45] Nov. 15, 1983

[54] HYDROCARBON CRACKING USING TRANSITION METAL OXIDE BRONSTED ACID CATALYSTS

[75] Inventors: Dane C. Grenoble, Plainfield; Lawrence L. Murrell, South Plainfield, both of N.J.

[73] Assignee: Exxon Research and Engineering Co., Florham Park, N.J.

[21] Appl. No.: 305,264

[22] Filed: Sep. 24, 1981

[51] Int. Cl.³ .............................................. C10G 11/04
[52] U.S. Cl. ................................... 208/120; 208/122; 208/123
[58] Field of Search ...................... 208/122, 123, 120; 252/464, 465

[56] References Cited

U.S. PATENT DOCUMENTS 2,990,249 6/1961 Wagner ................................ 423/613
3,006,738 10/1961 Wagner ................................ 422/208
3,130,008 4/1964 Stokes et al. ........................ 423/336
3,449,072 6/1969 Freeman ............................. 423/304
4,233,139 11/1980 Murrel et al. ....................... 208/112
4,244,811 1/1981 Grenoble et al. ................... 208/122
4,269,737 5/1981 Grenoble et al. ................... 252/464

*Primary Examiner*—Delbert E. Gantz
*Assistant Examiner*—Lance Johnson
*Attorney, Agent, or Firm*—Edward M. Corcoran

[57] ABSTRACT

Hydrocarbons are cracked by contacting same, at elevated temperature with a solid acid catalyst having primarily Bronsted acidity which comprises at least one catalytic metal oxide component selected from the group consisting essentially of oxides of (a) tungsten, niobium and mixtures thereof and (b) mixtures of (a) with tantalum, hafnium, chromium, titanium, zirconium and mixtures thereof, supported on pyrogenic alumina. The exceptional high temperature steam stability of these catalysts permits the use of steam in the reaction zone, if desired.

20 Claims, No Drawings

HYDROCARBON CRACKING USING TRANSITION METAL OXIDE BRONSTED ACID CATALYSTS

BACKGROUND OF THE INVENTION

1. Field of the Invention

This invention relates to a process for cracking hydrocarbons over transition metal oxide catalysts having Bronsted acidity. More particularly, this invention relates to cracking hydrocarbons by contacting same, at elevated temperature, which a solid acid catalyst having primarily Bronsted acidity which comprises at least one catalytic metal oxide component selected from the Group consisting essentially of oxides of (a) tungsten, niobium and mixtures thereof and (b) mixtures of (a) with tantalum, hafnium, chromium, titanium, zirconium and mixtures thereof, on a pyrogenic alumina support.

2. Background of the Disclosure

U.S. Pat. Nos. 4,269,737, 4,233,139 and 4,244,811 disclose solid acid catalysts comprising certain supported transition metal oxides, their preparation and use as acid cracking catalysts. The supports are refractory metal oxides which are not in themselves acid cracking catalysts, but which when combined with the transition metal oxide component result in acid cracking catalysts. These catalysts are taught as having enhanced activity and selectivity towards forming liquid products compared to conventional acid catalysts. They also exhibit remarkable resistance to coke make and have unusual steam stability. In fact, in some cases it is preferred to pre-steam these catalysts prior to use in order to stabilize the surface thereof. Although steaming these catalysts initially results in a decrease of both surface area and strong acid sites, the steaming itself serves to stabilize the remaining surface area and acidity which is not substantially adversely affected by subsequent steaming. The catalysts described in these patents exhibit primarily Lewis acidity.

SUMMARY OF THE INVENTION

It has now been discovered that solid acid cracking catalysts having primarily Bronsted acidity are obtained if certain selected transition metal oxides are supported on a suitable alumina support. The alumina support is a critical and essential feature of the catalysts useful in the process of this invention and must be one which, when combined with the transition metal oxide component, results in a catalyst which exhibits primarily Bronsted acidity. It has been found that pyrogenic alumina is such a suitable support. Thus, this invention relates to a process for cracking hydrocarbons comprising contacting a hydrocarbon feed, at elevated temperature, and in a cracking zone with a catalyst having primarily Bronsted acidity, said catalyst comprising oxides of one or more metals selected from the group consisting essentially of (a) tungsten, niobium and mixtures thereof, and (b) mixtures of (a) with tantalum, hafnium, chromium, titanium, zirconium and mixtures thereof, on a alumina support. Preferably the support will comprise a pyrogenic alumina and still more preferably the support will comprise a pyrogenic gamma-alumina that has been formed by the flame hydrolysis of an aluminum halide, such as aluminum chloride. These catalysts are extremely stable in the presence of steam at high temperatures (i.e. $\geq 600°$ C.) and when used as cracking catalysts produce significantly less coke than similar catalysts having primarily Lewis acidity. Further, their exceptional steam stability permits the use of steam in the cracking zone, if desired. By primarily Bronsted acidity is meant that at least 50% of the acid sites are Bronsted, preferably at least about 70% and still more preferably at least about 80%.

DETAILED DESCRIPTION

As has heretofore been stated, it is essential that the alumina support material for the catalysts useful in the process of this invention be one which exhibits primarily Bronsted acidity when combined with the transition metal oxide component. One such type of alumina has been found to be pyrogenic alumina. Pyrogenic alumina includes aluminas that have been formed by the flame hydrolysis of an aluminum halide, particularly aluminum chloride. In one process for forming this kind of alumina, hydrogen is burned in a furnace to produce water which then hydrolyzes gaseous aluminum chloride in the presence of the flame to give alumina and HCl. The hydrolysis is instantaneous. This process is disclosed in, for example, U.S. Pat. Nos. 2,990,249; 3,006,738; and 3,130,008. Aluminas produced by this flame hydrolysis process have exceptional purity and extremely fine particle size. They are primarily gamma-alumina and the fine alumina particles have virtually no porosity which means that the surface area is the external surface. Another method for making a pyrogenic alumina is that disclosed in U.S. Pat. No. 3,449,072 wherein an aluminum halide, such as aluminum chloride, is reacted directly with oxygen in a plasma such as an argon or nitrogen plasma.

The alumina support may contain other refractory metal oxides such as zirconia, boria, thoria, magnesia, zirconium titanate, titania, chromia, silica, kieselguhr and mixtures thereof, etc. Thus, the support will preferably comprise a suitable alumina such as a pyrogenic alumina. If the support comprises a mixture of silica and alumina, the silica content thereof will be less than 50 wt.% of the alumina content. The support should have a high surface area in the region of from about 20 to 500 $m^2/g$, preferably 40 to 200 $m^2/g$ and most preferably at least about 100 $m^2g$ prior to the deposition of the transition metal oxide salt precursor used in forming the catalyst. These surface areas are as measured by the Brunauer-Emmett-Teller (BET) method.

The catalysts useful in the process of this invention may also advantageously contain minor amounts of various promoter materials selected from one or more oxides of Group IIA. Particularly preferred are oxides of barium, calcium, strontium and mixtures thereof. These promotor materials, in the form of precursor salts, can be incorporated into the carrier simultaneously with the transition metal oxide precursor salt, or sequentially (the order of addition being merely a matter of choice), or may be coprecipitated with the metal precursor salts. Alternatively, they may be added subsequent to the formation of the catalyst composite. If used at all these promoters will be present in an amount ranging from about 0.01 to 4.0 wt.% promoter based on total catalyst composition wherein the amount of promoter metal oxide ranges from 0.1% to 4%, preferably, 0.1% to 0.5%.

Those skilled in the art know that solid acid catalysts have two types of acidity or acid sites, Lewis and Bronsted. Lewis acid sites are believed to be coordinatively unsaturated centers which are electron acceptors, whereas Bronsted acid sites are proton donors. Those skilled in the art also know, that one of the most widely used and accepted methods for determining the strength and amount of acidity or acid sites on cracking catalysts is the Benesi method employing titration with n-butyl amine (H. A. Benesi, J. Amer. Chem. Soc. 89, 5490 (1956)). However, the Benesi method will not distinguish between Lewis and Bronsted acid sites.

An effective way of determining the difference between Lewis and Bronsted acid sites is to titrate a sample of solid acid with a solution of 2,6-dimethylpyridine in toluene which selectively reacts with the Bronsted acid sites. This particular amine does not react with Lewis sites due to steric hindrance. After the Bronsted acid sites have reacted with the 2,6-dimethylpyridine, the sample of solid acid is then reacted with n-butyl amine using the Benesi method which yields the number of Lewis acid sites. The number of Bronsted acid sites is then determined by the difference between the Lewis acidity measured in this manner and the total acidity measured by the Benesi method on a sample that has not been treated with the 2,6-dimethylpyridine.

It should be noted that only those acid sites having a Hammett acidity coefficient of Ho $\leq 8.2$ are considered to be strong acid sites and it is these very strong acid sites which are believed to be primarily responsible for catalytic cracking reactions.

The catalysts useful in the hydrocarbon cracking process of this invention may be prepared by techniques well-known in the art, such as incipient wetness, impregnation, etc., the choice being left to the practitioner. When using the impregnation technique, the impregnating solution is contacted with the support material for a time sufficient to deposit the precursor material onto the support either by selective adsorption or alternatively, the excess solvent may be evaporated during drying leaving behind the precursor salt. Advantageously, incipient wetness techniques may also be used. The choice of catalyst preparation is left to the practitioner.

The final catalyst composite will then normally be dried at temperatures ranging from about 50°-300° C. to remove the excess solvent and, if necessary decompose the salt if it is an organic salt and the transition metal oxide precursors then converted into the oxide form by calcining at temperatures of from about 150° to 800° C. and preferably 300°-700° C. in a suitable oxidizing atmosphere such as air, oxygen, etc. Reducing atmospheres may also be used to decompose the transition metal oxide precursors, but the composite then requires subsequent calcination to convert the reduced metal component to the oxide form.

The catalysts of this invention will generally have metal oxide loadings of from about 0.5 to 25 wt% transition metal oxide based on the total catalyst composition, preferably from about 1 to 10 wt%, more preferably from about 2-8 wt% and most preferably from about 4-8 wt.%. When the catalytic metal oxide comprises a mixture of tungsten, niobium and mixtures thereof in combination with one or more oxides of tantalum, chromium, titanium, zirconium, hafnium and mixtures thereof, the ratio of tungsten oxide, niobium oxide or mixture thereof to the additional transition metal oxide or oxides will be at least about 1 to 1, preferably about 3 to 1 and still more preferably about 9 to 1.

The process of this invention is not feed limited and may be used to crack both natural and synthetic hydrocarbons, including heavy ends, resids and even asphaltenes. Cracking conditions in the reaction zone may include temperatures broadly ranging from about 250° to 1,000° C., preferably about 350° to 700° C., and most preferably from about 400°-600° C. at pressures of from 0 to 10,000 psig, preferably 10-500 psig. and with contact times ranging from less than 0.1 sec. to as high as 2000 secs., preferably 1 sec. to 120 secs. Weight hourly space velocities in the cracking zone will range 0.1 to 50 Weight Feed/Hr/Weight Catalyst (WHW), preferably 1-4 WHW. Optionally, $H_2O$ as steam may be added to the cracking zone along with the hydrocarbon feed. If this is done, the $H_2O$/hydrocarbon mole ratio will range from about 0.5-1 to 20:1, preferably 1:1 to 10:1.

DESCRIPTION OF A PREFERRED EMBODIMENT

The invention will more readily be understood by reference to the following examples.

EXAMPLES

In all of the examples, the pyrogenic $\gamma$-$Al_2O_3$ support used for the catalysts and catalyst precursors of this invention was Degussa's Aluminum Oxide C. This alumina is made by the flame hydrolysis of anhydrous aluminum chloride and has a (BET) surface area of 99 $m^2/g$. The $\gamma$-$Al_2O_3$ support used to make the catalysts of the prior art was a high purity reforming grade having a surface area of 180 $m^2/g$ obtained from Engelhard Industries, Inc. All catalysts and catalyst precursors were made using the incipient wetness technique wherein a solution of transition metal oxide precursor salt was applied to the support which was then dried overnight in air at 120° C. followed by calcining in air for 16 hours at 500° C. In those cases where the catalyst or catalyst precursor was steamed, the steaming was done in a tube furnace for 16 hours in an 80/20 mixture of helium/oxygen that had been sparged through water. All surface areas were measured using the BET method.

EXAMPLE 1

This Example demonstrates the superior steam stability of the catalyst useful in the process of this invention compared to catalysts comprising transition metal oxides on conventional $\gamma$-$Al_2O_3$.

A catalyst of this invlention comprising 5 wt.% $WO_3$ on the pyrogenic alumina support was prepared using an aqueous solution of ammonium meta tungstate. After drying and calcining, this catalyst was found to contain 216 $\mu$MOL/g (micro moles per gram) of transition metal which is equivalent to 2.23 $\mu$MOL/$m^2$ and had a surface area of 97 $m^2/g$, which is essentially identical to the surface area of the alumina support. A two gram portion of this catalyst was steamed at 900° C. and, after drying at 110° C. the surface area was found to be 95 $m^2/g$, which compares favorably with the unsteamed sample. Another two gram portion of this catalyst was steamed at 1100° C. which, after drying at 110° C. was found to have a surface area of 34 $m^2/g$.

A catalyst comprising 10 wt.% tungsten oxide (based on total catalyst weight) was prepared using a conventional $\gamma$-$Al_2O_3$ support which resulted in a catalyst containing 431 $\mu$MOL/g of tungsten which is equivalent to 2.39 $\mu$MOL/$m^2$ (micro moles per square meter). After calcining, portions of this catalyst were steamed at 900° C., and 1100° C. which resulted in surface areas of 163 $m^2/g$ after calcining and 71 and 8 $m^2/g$, respectively, for the steamed samples.

The results of this experiment are summarized in Table 1 and show that although a catalyst comprising tungsten oxide on a conventional γ-Al₂O₃ support starts out with a higher surface area then one using a pyrogenic alumina support, catalysts of this invention retain a higher surface area under severe steaming conditions. The surface area retention of catalysts of this invention suggests that they may be particularly attractive for catalytically cracking heavy, coke-producing feeds, because they can be regenerated with steam at high temperatures.

EXAMPLE 2

This example shows that certain Group IV, V and VIB transition metal oxides on a pyrogenic alumina support result in good surface area stability under conditions of high temperature steaming. A number of catalysts and catalyst precursors of this invention were prepared and subjected to steaming at 1100° C. After calcining, but prior to steaming, the surface area of the catalyst or precursor was essentially that of the support material ($\sim$99 m²/g).

A precursor consisting of 4.5 wt.% HfO₂ on the pyrogenic alumina was prepared using two impregnations of hafnium chloride in methanol with drying for two hours at 120° C. between impregnations which yielded a hafnium content of 216 μMOL/g. After steaming at 1100° C. the surface area was 34 m²/g.

Another precursor consisting of 5.6 wt.% Ta₂O₅ on the pyrogenic alumina was prepared using a solution of tantalum ethoxide in heptane followed by drying, heating at 300° C. for one hour to decompose the alkoxide and then calcining. The 1100° C. steaming treatment resulted in a surface area of 80 m²/g.

A catalyst of this invention consisting of 2.9 wt.% Nb₂O₅ on the pyrogenic alumina was prepared from a solution of niobium ethoxide in heptane. A sample of the calcined catalyst steamed at 1100° C. was found to have a surface area of 71 m²/g.

A precursor consisting of 3.1 wt.% MoO₃ on the pyrogenic alumina was prepared from a solution of ammonium molybdate. A sample of the calcined precursor was steamed at 1100° C. which reduced the surface area to 12 m²/g.

Finally, precursors consisting of 1.7 wt.% TiO₂ on the pyrogenic alumina and 2.65 wt.% ZrO₂ were prepared from solutions of titanium isopropoxide and zirconium tetrachloride. Steaming the calcined TiO₂ precursor at 1100° C. reduced its surface area to 67 m²/g.

The results of these experiments are set forth in Table 2, which also shows a comparison with a pyrogenic alumina that had been impregnated with distilled water, calcined at 500° C. and steamed at 1100° C. Also set forth in this Table, for comparison purposes are the results from Table 1 for 5 wt.% WO₃ on the Al₂O₃ C support. These data dramatically show that certain Group IV, V and VIB transition metal oxides on a pyrogenic alumina support impart exceptional surface area stability under severe steaming conditions.

EXAMPLE 3

Samples of both some of the precursors and the niobium oxide catalyst prepared in Example 2 were impregnated with an aqueous solution of ammonium metatungstate in an amount such that the final catalyst contained 216 m of tungsten oxide per gram of catalyst or 5 wt.% tungsten oxide based on the total catalyst weight. After impregnation and calcining, the catalysts had the same surface area as the support (99 m²/g). The five mixed oxide catalysts were then steamed at 1100° C. as described above and the results are presented in Table 3.

It is to be noted that the catalysts of this invention listed in Table 3 have surface areas significantly greater then that of the support itself (7 m²/g) following the high temperature, 1100° C. steaming treatment.

EXAMPLE 4

In this experiment, some of the catalysts and precursors of this invention prepared in Examples 1–3 were examined in detail using the Benesi method to determine the number of strong acid centers (Ho $\leq$ −8.2) after calcining at 500° C. and also after the 1100° C. steaming treatment. The results of this experiment are set forth in Table 4.

It is apparent from the data in Table 4 that the catalysts of this invention have, in general, remarkable retention of strong acid centers following an 1100° C. steaming treatment. Retention of these strong acid centers under this severe steaming condition has thus far been found to be unique to the catalysts of this invention. Catalysts capable of retaining strong acid centers under this severe steaming condition suggests their use for cracking processes wherein exposure to high temperature steam forms a part of the process.

EXAMPLE 5

In this experiment the effect of the amount of tungsten oxide on the pyrogenic alumina support was investigated at various concentrations of tungsten oxide in order to determine the number of Bronsted acid sites. These catalysts were prepared using the incipient wetness technique heretofore described followed by calcining at 500° C. and the results are set forth in Table 5. Also set forth in Table 5 is a comparison with a catalyst consisting of 10 wt.% WO₃ on conventional γ-Al₂O₃.

These data show that tungsten oxide on the pyrogenic alumina has primarily Bronsted acid sites, whereas the tungsten oxide on ordinary γ-AL₂O₃ has primarily Lewis acid sites.

EXAMPLE 6

A number of catalysts useful in the process of this invention were used to crack a gas oil feed in a micro activity test unit (MAT) modified to allow for water addition (steam) along with the feed. The MAT unit is recognized in the industry as a standard diagnostic test unit for cat cracking catalysts (see Ciapetta, F. G. and D. J. Henderson, Oil and Gas J 65 (72), 88, (1967) and Gustofson, W. R., Div. of Pet. Chem, ACS, Preprints 14, B46 (1969).

The oil feed was an East Texas Light Gas Oil having a boiling range of from 450°–700° F. The operating conditions for the tests were:

H₂O: Oil mole ratio=3
Temp. (catalyst) 900° F. (482° C.)
Pressure 1 atmosphere
(WHSV) oil 8 hr⁻¹ (weight hourly space velocity)

The information obtained from the tests was the overall vol.% conversion and the amount of conversion to 400-° F. liquids (naphtha gasoline), coke and hydrogen gas.

The conversion data to coke and hydrogen are compared to a standard catalyst's performance under identical conversion levels. Thus, instead of presenting coke and hydrogen production values as absolute numbers, they are made relative to a conventional silica-alumina catalyst operated under identical conversion conditions. Thus coke producing factor means the amount of coke produced on the experimental catalyst relative to that produced on a standard silica-alumina catalyst under identical conditions. Similarly, the hydrogen production factor is the amount of hydrogen produced by the experimental catalyst relative to the standard. Selectivity to 400-° F. liquids (gasoline) is the percentage of the total conversion by weight that went to 400-° F. liquids.

The results are given in Table 6 and demonstrate the process of this invention.

TABLE I

Steam Stability of $WO_3$ on Conventional and Pyrogenic $\gamma$-$Al_2O_3$

| | Steaming Temperature (°C.) | Surface Area (m²/g) |
|---|---|---|
| Pyrogenic $\gamma$-$Al_2O_3$ | — | 99 |
| + 5 wt. % $WO_3$ | — | 97 |
| + 5 wt. % $WO_3$ | 900 | 95 |
| + 5 wt. % $WO_3$ | 1100 | 34 |
| Conventional $\gamma$-$Al_2O_3$ | — | 180 |
| + 10 wt. % $WO_3$ | — | 163 |
| + 10 wt. % $WO_3$ | 900 | 71 |
| + 10 wt. % $WO_3$ | 1100 | 8 |

TABLE 2

1100° C. Steam Stability of Certain Group IV, V, and VI B Transition Metal Oxides on Pyrogenic Alumina

| | Surface Area (m²/g) after steaming |
|---|---|
| Pyrogenic alumina | 7 |
| + 3.1 wt. % $MoO_3$ | 21 |
| + 5 wt. % $WO_3$ | 34 |
| + 1.7 wt. % $TiO_2$ | 67 |
| + 2.9 wt. % $Nb_2O_5$ | 71 |
| + 4.6 wt. % $HfO_2$ | 77 |
| + 5.6 wt. % $Ta_2O_5$ | 80 |

TABLE 3

Surface Areas of Mixed Transition Metal Oxides on Pyrogenic Alumina Following an 1100° C. Steaming Treatment

| Sample | Surface Area (m²/g) |
|---|---|
| 5 wt. % $WO_3$ + 1.7 wt. % $TiO_2$ | 20 |
| 5 wt. % $WO_3$ + 2.7 wt. % $ZrO_2$ | 34 |
| 5 wt. % $WO_3$ + 4.6 wt. % $HfO_2$ | 39 |
| 5 wt. % $WO_3$ + 2.9 wt. % $Nb_2O_5$ | 25 |
| 5 wt. % $WO_3$ + 4.8 wt. % $Ta_2O_5$ | 56 |
| Pyrogenic alumina | 7 |

TABLE 4

Retention of Strong Acid Centers*

| | Number Ho ≦ −8.2 Sites for 500° C. Calcined Samples $\mu$ (moles/g) | Number Ho ≦ −8.2 Sites for 1100° C. Steamed Samples $\mu$ (moles/g) | Surface Area for 1100° C. Steamed Samples (m²/g) |
|---|---|---|---|
| 5 wt. % $WO_3$ | 225 | 25 | 34 |
| 1.7 wt. % $TiO_2$ | 25 | 75 | 67 |
| 4.5 wt. % $HfO_2$ | 225 | 38 | 77 |
| 2.9 wt. % $Nb_2O_5$ | 275 | 50 | 80 |
| 4.8 wt. % $Ta_2O_5$ | 275 | 75 | 71 |
| 5 wt. % $WO_3$ + 1.7 wt. % $TiO_2$ | 75 | 0 | 20 |
| 5 wt. % $WO_3$ + 2.6 wt. % $ZrO_2$ | 125 | 25 | 36 |
| 5 wt. % $WO_3$ + 4.5 wt. % $HfO_2$ | 75 | 38 | 39 |
| 5 wt. % $WO_3$ + 2.9 wt. % $Nb_2O_5$ | 125 | 25 | 25 |
| 5 wt. % $WO_3$ + 4.8 wt. % $Ta_2O_5$ | 25 | 75 | 56 |

Note:
Catalyst support was pyrogenic $\gamma$-$Al_2O_3$.

TABLE 5

Bronsted Acidity of $WO_3$ on Pyrogenic Alumina Catalysts

| Sample | Total number (Lewis & Bronsted) of sites Ho ≦ −8.2 $\mu$mol/g | Number of Bronsted Sites Ho ≦ −8.2 $\mu$mol/g |
|---|---|---|
| 5 wt. % $WO_3$ | 225 | 200 |
| 10 wt. % $WO_3$ | 325 | 275 |
| 20 wt. % $WO_3$ | 325 | 250 |
| 10 wt. % $WO_3$* | 275 | 50 |

*On reforming grade $\gamma$-$Al_2O_3$

TABLE 6

Cracking Activity of Bronsted Acid Transition Metal Oxide Catalysts

| Transition Metal Oxide Component* | Volume % Conversion to 400° F. Fraction | Carbon Producing Factor | Hydrogen Producing Factor |
|---|---|---|---|
| 5% $WO_3$ | 19 | 1.0 | 5.9 |
| 5% $WO_3$ + 1.7% $TiO_2$ | 25 | 1.1 | 6.8 |
| 5% $WO_3$ + 2.6% $ZrO_2$ | 21 | 0.9 | 4.6 |
| 5% $WO_3$ + 4.5% $HfO_2$ | 22 | 0.9 | 6.5 |
| 5% $WO_3$ + 2.9% $Nb_2O_5$ | 33 | 1.0 | 6.9 |
| 5% $WO_3$ + 4.8% $Ta_2O_5$ | 25 | 0.9 | 6.9 |

*Support was Degussa's Aluminum Oxide C.

EXAMPLE 7

In this experiment, basic asphaltenes derived from a Cold Lake crude oil were deposited on a catalyst consisting of 10 wt.% $WO_3$ on the pyrogenic alumina. The basic asphaltenes were then catalytically cracked off the catalyst at 550° C. to produce liquids, gas and a coked catalyst. The cracking was done by placing the basic asphaltene-laden catalyst in a quartz tube which was then inserted in a rapid pyrolysis unit which comprised a hot iron block. The coked catalyst was then regenerated using the 16 hours, 900° C. steaming treatment followed by calcining at 500° C.

This experiment demonstrates that the process of this invention is useful for cracking the heaviest feeds.

EXAMPLE 8

In this experiment, Cold Lake asphaltenes were deposited onto the surface of a number of different catalysts in an amount of 20 wt.% of each catalyst by adding the catalyst to a solution of the asphaltenes in toluene under a blanket of nitrogen, followed by removing the toluene in a rotary evaporator, drying in vacuo at 80° C. and grinding to a 20 mesh particle size. The activity and selectivity of each catalyst for cracking off the asphaltenes was determined using the rapid pyrolysis technique set forth in Example 7 wherein the asphaltenes were catalytically cracking off at 550° C. The results are shown in Table 7.

These data show that the process of this invention produced the greatest amount of liquid product from the Cold Lake asphaltenes.

TABLE 7

| Catalyst | Catalyst Pretreatment | % Liquids | % Coke |
| --- | --- | --- | --- |
| None | — | 27 | 61 |
| 10% WO$_3$ on γ-Al$_2$O$_3$ | Calcined at 500° C. | 30 | 60 |
| 10% WO$_3$ on γ-Al$_2$O$_3$ | 20% O$_2$ in He-Steamed at 900° C. then Calcined at 500° C. | 32 | 58 |
| Silica-Alumina | Calcined at 500° C. | 32 | 58 |
| 10% WO$_3$ on pyrogenic γ-Al$_2$O$_3$* | Calcined at 500° C. | 35 | 54 |

*Degussa Aluminum Oxide C

What is claimed is:

1. A process for cracking hydrocarbons comprising contacting a hydrocarbon feed, at elevated temperature and in a cracking zone, with a catalyst having primarily Bronsted acidity, said catalyst comprising at least one catalytic metal oxide selected from the group consisting essentially of the oxides of (a) tungsten, niobium and mixtures thereof and (b) mixtures of (a) with tantalum, hafnium, chromium, titanium, zirconium and mixtures thereof on an alumina support.

2. The process of claim 1 wherein said support comprises a pyrogenic alumina.

3. The process of claim 2 wherein said elevated temperature ranges from about 650° to 1200° F.

4. The process of claim 3 wherein said alumina comprises a gamma alumina.

5. The process of claim 4 wherein steam is present in said cracking zone.

6. The process of either of claims 4 or 5 wherein said gamma alumina is formed by the flame hydrolysis of an aluminum halide.

7. The process of claim 6 wherein said alumina support contains silica in an amount less than about 50% of the alumina content thereof.

8. The process of either of claims 4 or 7 wherein said catalyst also contains at least one Group IIA metal oxide promoter.

9. The process of claim 8 wherein said promoter material comprises at least one oxide selected from the group consisting essentially of oxides of metals of Group IIA.

10. The process of claim 9 wherein said catalyst is regenerated in the presence of steam at a temperature of at least about 1500° F.

11. The process of claim 10 wherein said catalyst is subjected to steaming before use at temperatures ranging from about 600° to 1200° C.

12. The process of claim 11 wherein said alumina support consists essentially of a pyrogenic gamma-alumina.

13. A process for cracking hydrocarbons which comprises contacting a hydrocarbon feed, in a cracking zone and at a temperature of at least about 250° C., with an acid cracking catalyst having primarily Bronsted acidity, said catalyst comprising at least one catalytic metal oxide selected from the group consisting of the oxides of (a) tungsten, niobium and mixtures thereof, and (b) mixtures of (a) with tantalum, hafnium, chromium, titanium, zirconium and mixtures thereof supported on a support comprising a pyrogenic alumina and wherein said catalytic metal oxide component is present on said support in an amount ranging from about 0.5 to 25 wt.% of the total catalyst composition.

14. The process of claim 13 wherein said alumina support contains silica in an amount less than about 50% of the alumina content thereof.

15. The process of either of claims 13 or 14 wherein steam is present in said cracking zone.

16. The process of claim 14 wherein said alumina is formed by the flame hydrolysis of aluminum chloride.

17. The process of claim 15 wherein said alumina is formed by the flame hydrolysis of aluminum chloride.

18. A process for cracking hydrocarbons which comprises contacting a hydrocarbon feed, at elevated temperature and in a cracking zone, with a catalyst having primarily Bronsted acidity, said catalyst comprising at least one catalytic metal oxide selected from the group consisting essentially of the oxides of tungsten, niobium and mixtures thereof in combination with one or more oxides of tantalum, hafnium, chromium, titanium, zirconium and mixtures thereof on a pyrogenic alumina support.

19. The process of claim 18 wherein said alumina support is formed from the flame hydrolysis of aluminum chloride.

20. The process of either of claims 17 or 18 wherein said support contains silica in an amount less than 50 wt.% of the alumina content thereof.

* * * * *